US012340801B2

(12) United States Patent
Shin (10) Patent No.: US 12,340,801 B2
(45) Date of Patent: Jun. 24, 2025

(54) BYPASSING HOT WORD DETECTION FOR AN AUTOMATED ASSISTANT BASED ON DEVICE-TO-DEVICE PROXIMITY

(71) Applicant: GOOGLE LLC, Mountain View, CA (US)

(72) Inventor: Dongeek Shin, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 247 days.

(21) Appl. No.: 18/100,990

(22) Filed: Jan. 24, 2023

(65) Prior Publication Data
US 2024/0249720 A1    Jul. 25, 2024

(51) Int. Cl.
G06F 3/0346    (2013.01)
G06F 1/16    (2006.01)
(Continued)

(52) U.S. Cl.
CPC .............. *G10L 15/22* (2013.01); *G06F 1/163* (2013.01); *G10L 15/08* (2013.01); *G10L 2015/088* (2013.01); *G10L 2015/223* (2013.01)

(58) Field of Classification Search
None
See application file for complete search history.

(56) References Cited

U.S. PATENT DOCUMENTS 10,649,727 B1 *   5/2020   Douglas .................. H04L 67/34
2015/0127594 A1 *  5/2015   Parada San Martin .....................
                                                    G10L 15/16
                                                    706/16
(Continued)

FOREIGN PATENT DOCUMENTS

WO   2016085776 A1   6/2016
WO   2022050972 A1   3/2022
(Continued)

OTHER PUBLICATIONS

Saad, M. et al., "Ultrasonic Hand Gesture Recognition for Mobile Devices"; Journal on Multimodal User Interfaces; pp. 31-39; dated 2018.
European Patent Office; International Search Report and Written Opinion issued in Application No. PCT/US2024/012588; 12 pages; dated May 6, 2024.

*Primary Examiner* — Seong-Ah A Shin
(74) *Attorney, Agent, or Firm* — Gray Ice Higdon (57) ABSTRACT

Implementations relate to an automated assistant that can bypass invocation phrase detection when an estimation of device-to-device distance satisfies a distance threshold. The estimation of distance can be performed for a set of devices, such as a computerized watch and a cellular phone, and/or any other combination of devices. The devices can communicate ultrasonic signals between each other, and the estimated distance can be determined based on when the ultrasonic signals are sent and/or received by each respective device. When an estimated distance satisfies the distance threshold, the automated assistant can operate as if the user is holding onto their cellular phone while wearing their computerized watch. This scenario can indicate that the user may be intending to hold their device to interact with the automated assistant and, based on this indication, the automated assistant can temporarily bypass invocation phrase detection (e.g., invoke the automated assistant).

20 Claims, 6 Drawing Sheets

(51) Int. Cl.
  *G10L 15/08* (2006.01)
  *G10L 15/22* (2006.01)
  *G10L 15/30* (2013.01)

(56) References Cited

U.S. PATENT DOCUMENTS

| | | | | |
|---|---|---|---|---|
| 2016/0134737 | A1* | 5/2016 | Pulletikurty | G06F 3/0485 |
| | | | | 715/735 |
| 2017/0025121 | A1* | 1/2017 | Tang | G10L 15/20 |
| 2017/0084277 | A1* | 3/2017 | Sharifi | G10L 15/32 |
| 2017/0345422 | A1* | 11/2017 | Yang | G06F 3/167 |
| 2018/0060144 | A1* | 3/2018 | Capobianco | G06F 3/0346 |
| 2018/0324897 | A1* | 11/2018 | Wu | H04W 88/04 |
| 2019/0304464 | A1* | 10/2019 | Sakurai | G10L 15/01 |
| 2020/0193982 | A1* | 6/2020 | Kim | G10L 15/30 |
| 2021/0255820 | A1* | 8/2021 | Delaney | H04N 21/44218 |
| 2022/0103927 | A1* | 3/2022 | Bhowmik | G06F 3/167 |
| 2023/0139626 | A1* | 5/2023 | Berliner | G06F 1/1694 |
| | | | | 345/156 |
| 2023/0245662 | A1* | 8/2023 | Tyagi | H04L 12/1822 |
| | | | | 704/246 |

FOREIGN PATENT DOCUMENTS

| | | |
|---|---|---|
| WO | 2022103413 A1 | 5/2022 |
| WO | 2022139837 | 6/2022 |
| WO | 2022169502 A1 | 8/2022 |

\* cited by examiner

BYPASSING HOT WORD DETECTION FOR AN AUTOMATED ASSISTANT BASED ON DEVICE-TO-DEVICE PROXIMITY

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input.

Spoken utterances are typically considered active inputs that can invoke the automated assistant, and many automated assistants limit their invocation to such active inputs. Although this may be suitable in many circumstances, such as when a user is not preoccupied with other tasks, there are circumstances in which the user may not be able to provide an active input to their automated assistant, but may nonetheless wish to invoke their automated assistant. As a result, opportunities for the automated assistant to complete tasks (e.g., creating a reminder, controlling a device, etc.) for the user may be missed, which can cause various limited resources not to be utilized most effectively. For example, providing multiple invocation phrases over a relatively short period of time can waste time and processing bandwidth when a user is clearly in a context (e.g., wearing an assistant-enabled watch while holding their assistant-enabled cellphone) in which assistant interactions are expected to occur.

SUMMARY

Implementations set forth herein relate to an automated assistant that can transition to a mode, for responding to spoken utterances without an initial predetermined invocation phrase, when a user is determined to be holding onto their assistant-enabled device while wearing a computerized watch, or other device. Determining whether the user is holding another device while wearing their computerized watch can include determining whether a distance between the devices satisfies a threshold distance. The computerized watch, the other computing device, and/or a network device can determine whether the threshold distance is satisfied based on signals communicated between the computerized watch and the other computing device. For example, the computerized watch can communicate a first ultrasonic signal to the other computing device, optionally based on data available to the computerized watch and/or the other computing device.

In response to receiving the first ultrasonic signal, the other computing device can provide a second ultrasonic signal, which can be the same or different from the first ultrasonic signal. The computerized watch can receive the second ultrasonic signal and determine an estimated distance between the computerized watch and the other computing device. Alternatively, or additionally, the computerized watch can communicate data to the other computing device to allow the other computing device to estimate the distance between the computerized watch and the other computing device. When a determination is made that the distance between the devices satisfies a distance threshold, an automated assistant application, accessible via one or both of the devices, can operate according to a mode in which the automated assistant application is responsive to spoken utterances without necessarily receiving a prior invocation phrase. For example, when the automated assistant application is operating in this mode, the user can provide a spoken utterance such as, "Play my workout mix," and in response, the automated assistant can render music for the user without having initially received an invocation phrase such as, "Assistant."

In some implementations, the distance between devices can be estimated in multiple different ways. For example, the distance can be estimated based on a time when the first ultrasonic signal was provided by the computerized watch and another time when the first ultrasonic signal was received by the other computing device. Alternatively, the distance can be estimated based on a round trip time, or other total estimated time, that is calculated using a time when the first ultrasonic signal was provided by the computerized watch, another time when the second ultrasonic signal was received by the computerized watch from the other computing device, and a response time of the other computing device being subtracted from the difference between those two times. Alternatively, the distance can be estimated based on a first timestamp when the computerized watch provided the first ultrasonic signal, a second timestamp when the computerized watch received the second ultrasonic signal, a third time stamp when the other computing device received the first ultrasonic signal, and a fourth timestamp when the other computing device provided the second ultrasonic signal. In this case, the estimated round trip time would be the difference between the second timestamp and the first timestamp, minus another difference between the fourth timestamp and the third time stamp.

In some implementations, one or more of the ultrasonic signals communicated between devices can embody data for assisting with determining the distance between the devices. For example, devices associated with a particular user can provide ultrasonic signals of a particular frequency that is different from other ultrasonic signals that other users' devices provide for a similar purpose. Alternatively, or additionally, each respective device can provide a unique frequency; therefore, the data communicated via the ultrasonic signal can be the frequency embodied in the ultrasonic signal. In some implementations, one or more time stamps can be embodied in an ultrasonic signal communicated between devices, and/or the timestamps can be embodied in data as communicated through another modality, such as through an antenna of a Bluetooth, Wi-Fi, and/or cellular interface.

In some implementations, the computerized watch, the other computing device, and/or any other application or device associated with the user can initiate communications of the ultrasonic signals, or another process, for determining the distance between the computerized watch and the other computing device. For example, the other computing device, such as a cellular phone, can send the first ultrasonic signal to the computerized watch, and the computerized watch can send a second ultrasonic signal to the other competing device. In some implementations, the first ultrasonic signal can be communicated to another device in response to certain data available to one or more of the devices. For example, a sensor of the computerized watch can indicate that the user has exhibited a particular grip and/or motion, thereby indicating a probability that the user is gripping their cellular phone. Alternatively, or additionally, other contextual data can be generated by one or more sensors for indicating whether a user is likely holding their other device while wearing the computerized watch. For example, a camera or light sensor can indicate a change in detected light, thereby indicating the user is removing their other device from their pocket. In response, the computerized watch can communicate a first ultrasonic signal to the other computing device in furtherance of determining whether the other computing device is within a threshold distance from the computerized watch and/or that the user is otherwise holding the other computing device. Thereafter, when the computerized watch is determined to be within a threshold distance of the other computing device, the automated assistant application can be caused to operate in a mode for bypassing invocation phrase detection (e.g., "hot word" detection). For example, the automated assistant application can operate as if an invocation phrase had been detected (e.g., performing automatic speech recognition, etc.), without requiring invocation phrase detection or any other explicit user directed invocation. Put another way, the automated assistant can be invoked in response to the devices being determined to be within a threshold distance of one another, and independent of any explicit user directed invocation. In this way, false positives for indicating whether a user is gripping their device can be mitigated by detecting certain other environmental and/or contextual factors for conclusively determining whether a user is, for example, wearing their computerized watch while gripping their cellular phone.

The above description is provided as an overview of some implementations of the present disclosure. Further descriptions of those implementations, and other implementations, are described in more detail below.

Other implementations may include a non-transitory computer-readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
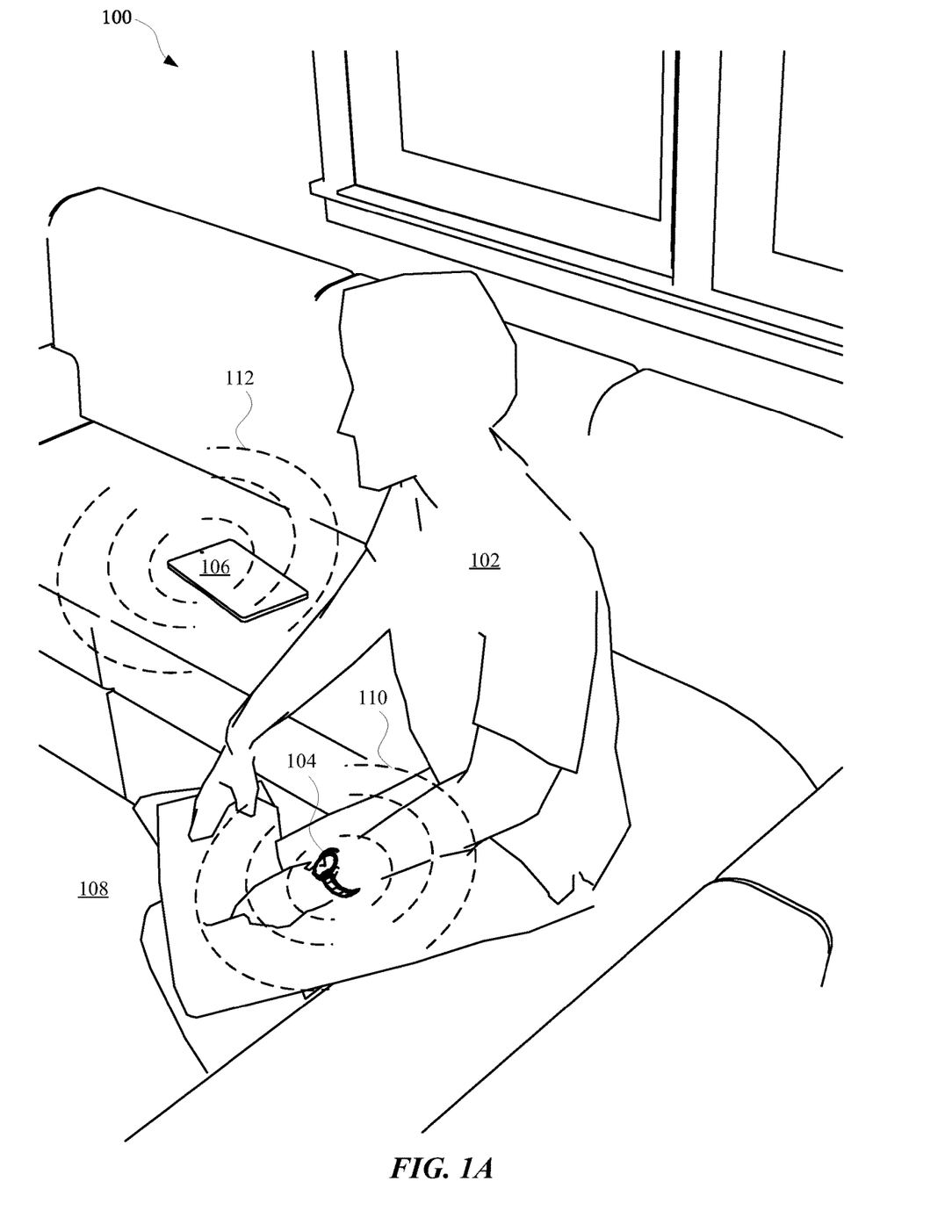
FIG. 1A, FIG. 1B, and FIG. 1C illustrate views of a user picking up their cellular phone while wearing a computerized watch and, as a result, causing an automated assistant to operate according to a particular mode.
Figure 1B:
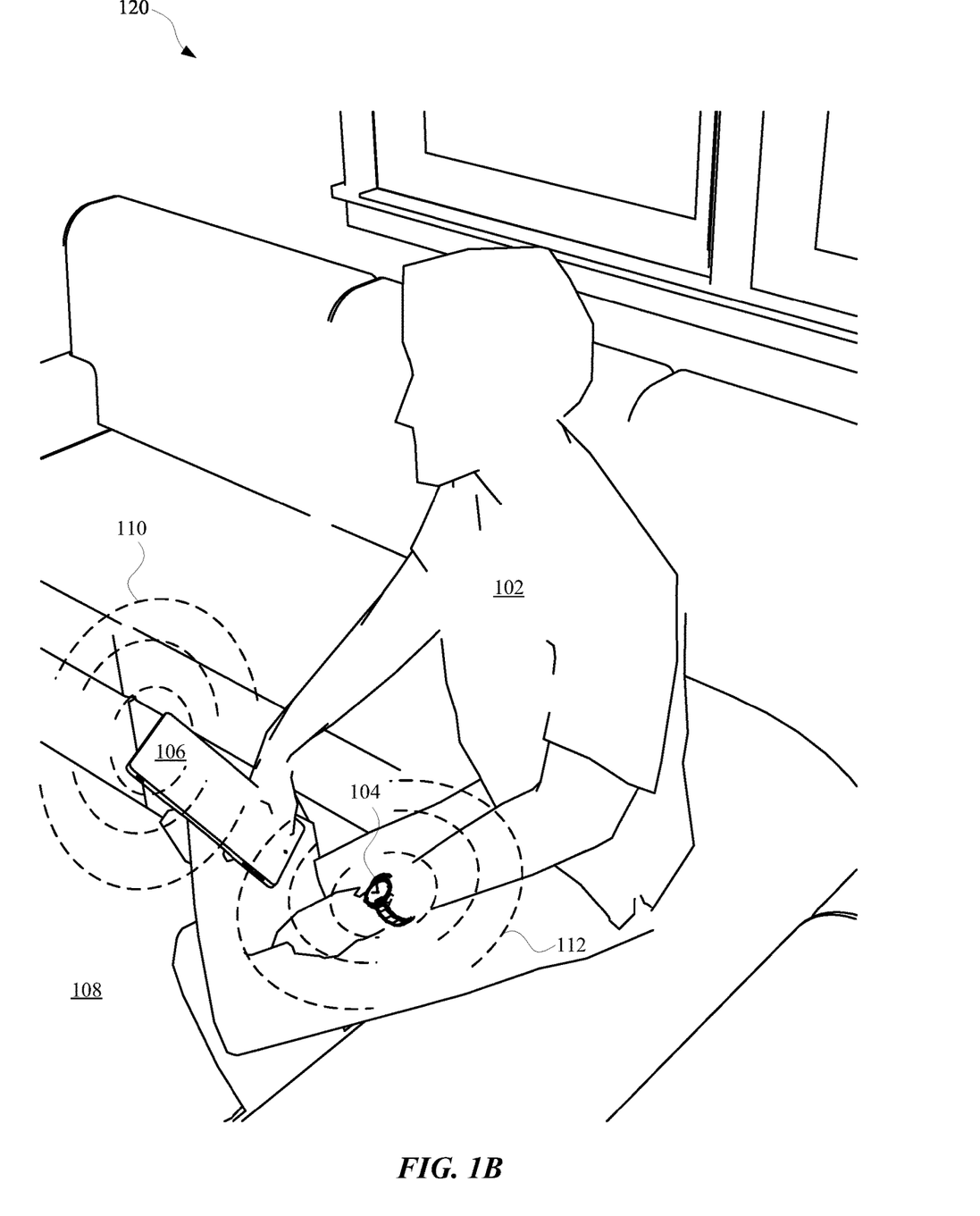
Figure 1C:
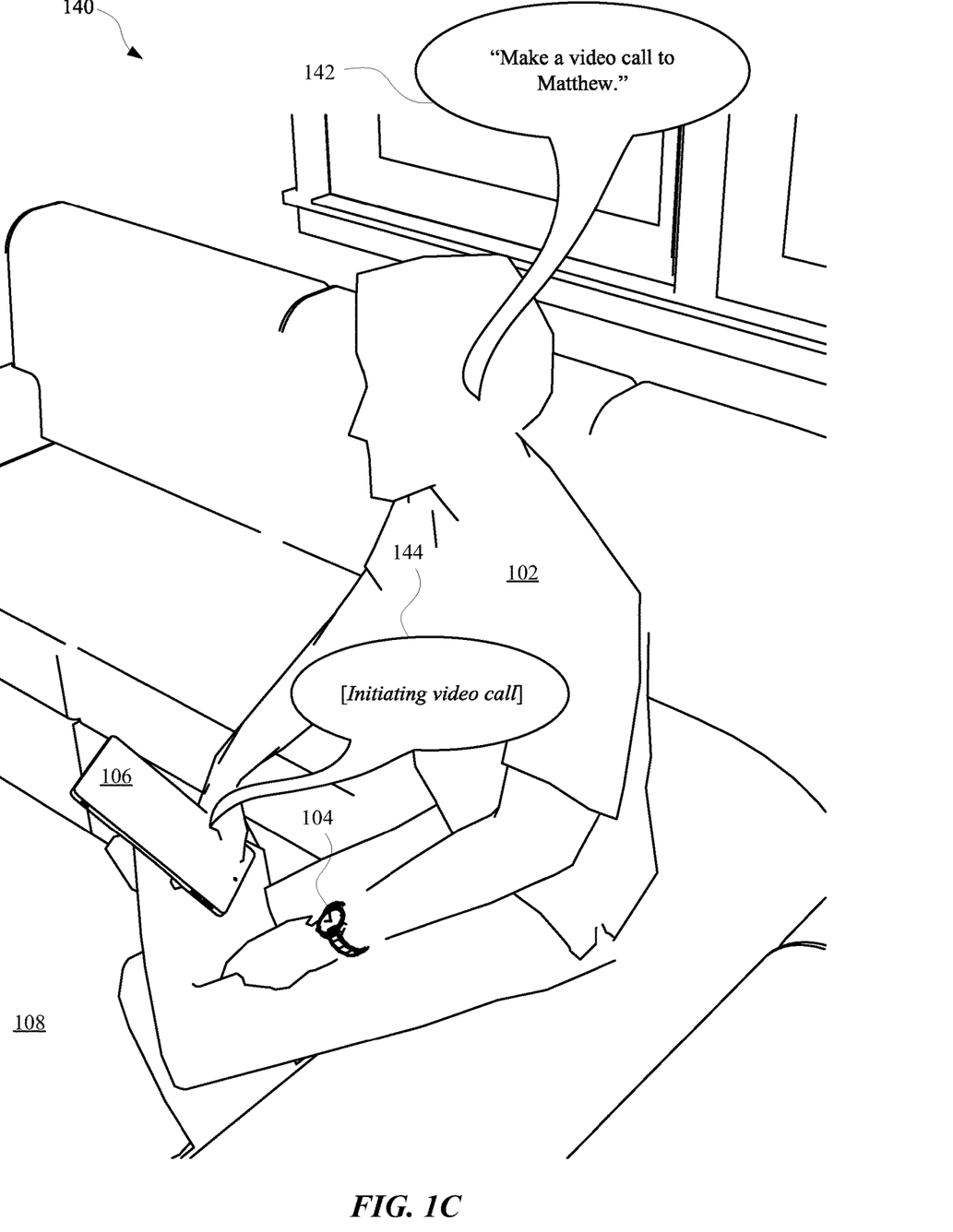

FIG. 1A, FIG. 1B, and FIG. 1C illustrate a view 100, a view 120, and a view 140 of a user 102 picking up their cellular phone 106 while wearing a computerized watch 104 and, as a result, causing an automated assistant to operate according to a particular mode. The cellular phone 106 can include an automated assistant application that can be controlled at the cellular phone 106 and/or the computerized watch 104. The computerized watch 104 and the cellular phone 106, and/or any other assistant-enabled device, can estimate a distance between devices to determine whether the user 102 is holding a particular device while wearing the computerized watch 104. The process for determining the estimated distance can be initiated with or without data indicating that a change in environment 108, or other context, has occurred. For example, one or more sensors of the cellular phone 106, the computerized watch 104, and/or any other device can provide information from which to conclude that the user has picked up their cellular phone while wearing the computerized watch 104. In response, the process for estimating the distance between the devices can be initiated. Alternatively, the process for estimating the distance between the devices can be initiated without receiving such sensor data.

In some implementations, the computerized watch 104 can provide a first ultrasonic signal 110 before the cellular phone 106 provides a second ultrasonic signal 112. In some implementations, the cellular phone 106 can provide the second ultrasonic signal 112 before the computerized watch 104 provides the first ultrasonic signal 110. The estimated distance between the devices can then be determined based on receipt times and sending times for each respective signal. For example, the first ultrasonic signal 110 can be provided with data, such as a frequency or other embodied data, and can be received by the cellular phone 106. In response to receiving the first ultrasonic signal 110, the cellular phone 106 can initiate providing the second ultrasonic signal 112, which can include other data, such as another frequency or the same frequency, or other embodied data. The computerized watch 104 can detect the second ultrasonic signal 112 and, in response, generate time data that indicates a time of receipt of the second ultrasonic signal. In some implementations, the estimated distance can be determined at the computerized watch 104, the cellular phone 106, and/or another associated device, such as a server or other computer.

The estimated distance can then be compared to a distance threshold for determining whether the user 102 is holding their cellular phone 106 while wearing the computerized watched 104. As illustrated in FIG. 1A, the user 102 may not be holding their cellular phone 106 while wearing the computerized watch 104, and therefore any change to an operating mode of the automated assistant may not be undertaken. However, when the estimated distance satisfies the distance threshold, the user 102 can be reasonably expected to be holding their cellular phone 106 while wearing the computerized watch 104, as illustrated in FIG. 1B. As a result, the automated assistant application, and/or any other application, can transition into a mode for responding to spoken utterances without necessitating a predetermined invocation phrase being initially provided by the user 102. In other words, a process for detecting invocation phrases, such as a hot word detection process, can be bypassed at least temporarily when the distance threshold is satisfied by the estimated distance. In some implementations, the estimated distance can be calculated again, after a duration of time has transpired, and/or when a detected change in the context of the user 102 has occurred.

When the automated assistant is operating in the mode for responding to certain spoken utterances without an invocation phrase, the user 102 can provide certain spoken inputs that can be processed using automatic speech recognition and direct the automated assistant to perform certain operations. For example, and as illustrated and FIG. 1C, the user 102 can provide a spoken utterance 142 such as, "Make a video call to Matthew." Because the automated assistant application is operating in the mode for bypassing detecting invocation phrases, the automated assistant can process the spoken utterance and initialize one or more operations in furtherance of fulfilling any command embodied in the spoken utterance. For example, the automated assistant can begin an operation 144 of initiating a video call to a contact by the name of "Matthew." Allowing the automated assistant to operate in this way can preserve computational resources and power, which might otherwise be consumed indiscriminately processing audio for determining whether the user 102 provided an invocation phrase.

Figure 2:
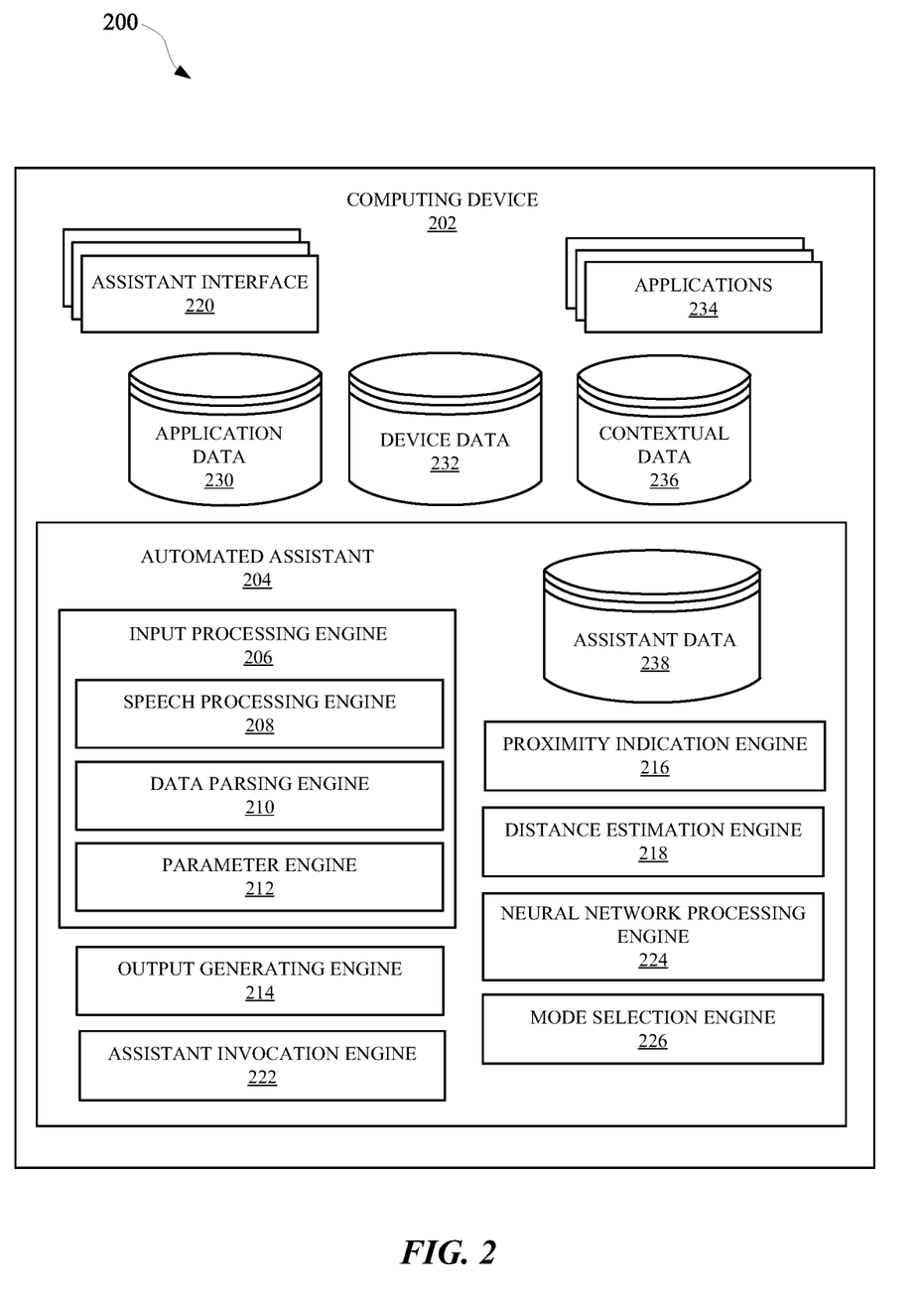
FIG. 2 illustrates a system that provides an automated assistant that can transition to a mode, for responding to spoken utterances without an initial predetermined invocation phrase, when a user is determined to be holding onto their assistant-enabled device while wearing a computerized watch, or other device.

FIG. 2 illustrates a system 200 that provides an automated assistant 204 that can transition to a mode, for responding to spoken utterances without an initial predetermined invocation phrase, when a user is determined to be holding onto their assistant-enabled device while wearing a computerized watch, or other device. The automated assistant 204 can operate as part of an assistant application that is provided at one or more computing devices, such as a computing device 202 and/or a server device. A user can interact with the automated assistant 204 via assistant interface(s) 220, which can be a microphone, a camera, a touch screen display, a user interface, and/or any other apparatus capable of providing an interface between a user and an application. For instance, a user can initialize the automated assistant 204 by providing a verbal, textual, and/or a graphical input to an assistant interface 220 to cause the automated assistant 204 to initialize one or more actions (e.g., provide data, control a peripheral device, access an agent, generate an input and/or an output, etc.). Alternatively, the automated assistant 204 can be initialized based on processing of contextual data 236 using one or more trained machine learning models and/or neural network models. The contextual data 236 can characterize one or more features of an environment in which the automated assistant 204 is accessible, and/or one or more features of a user that is predicted to be intending to interact with the automated assistant 204. The computing device 202 can include a display device, which can be a display panel that includes a touch interface for receiving touch inputs and/or gestures for allowing a user to control applications 234 of the computing device 202 via the touch interface. In some implementations, the computing device 202 can lack a display device, thereby providing an audible user interface output, without providing a graphical user interface output. Furthermore, the computing device 202 can provide a user interface, such as a microphone, for receiving spoken natural language inputs from a user. In some implementations, the computing device 202 can include a touch interface and can be void of a camera, but can optionally include one or more other sensors.

The computing device 202 and/or other third party client devices can be in communication with a server device over a network, such as the internet. Additionally, the computing device 202 and any other computing devices can be in communication with each other over a local area network (LAN), such as a Wi-Fi network. The computing device 202 can offload computational tasks to the server device to conserve computational resources at the computing device 202. For instance, the server device can host the automated assistant 204, and/or computing device 202 can transmit inputs received at one or more assistant interfaces 220 to the server device. However, in some implementations, the automated assistant 204 can be hosted at the computing device 202, and various processes that can be associated with automated assistant operations can be performed at the computing device 202.

In various implementations, all or less than all aspects of the automated assistant 204 can be implemented on the computing device 202. In some of those implementations, aspects of the automated assistant 204 are implemented via the computing device 202 and can interface with a server device, which can implement other aspects of the automated assistant 204. The server device can optionally serve a plurality of users and their associated assistant applications via multiple threads. In implementations where all or less than all aspects of the automated assistant 204 are implemented via computing device 202, the automated assistant 204 can be an application that is separate from an operating system of the computing device 202 (e.g., installed "on top" of the operating system)—or can alternatively be implemented directly by the operating system of the computing device 202 (e.g., considered an application of, but integral with, the operating system).

In some implementations, the automated assistant 204 can include an input processing engine 206, which can employ multiple different modules for processing inputs and/or outputs for the computing device 202 and/or a server device. For instance, the input processing engine 206 can include a speech processing engine 208, which can process audio data received at an assistant interface 220 to identify the text embodied in the audio data. The audio data can be transmitted from, for example, the computing device 202 to the server device in order to preserve computational resources at the computing device 202. Additionally, or alternatively, the audio data can be exclusively processed at the computing device 202.

The process for converting the audio data to text can include a speech recognition algorithm, which can employ neural networks, and/or statistical models for identifying groups of audio data corresponding to words or phrases. The text converted from the audio data can be parsed by a data parsing engine 210 and made available to the automated assistant 204 as textual data that can be used to generate and/or identify command phrase(s), intent(s), action(s), slot value(s), and/or any other content specified by the user. In some implementations, output data provided by the data parsing engine 210 can be provided to a parameter engine 212 to determine whether the user provided an input that corresponds to a particular intent, action, and/or routine capable of being performed by the automated assistant 204 and/or an application or agent that is capable of being accessed via the automated assistant 204. For example, assistant data 238 can be stored at the server device and/or the computing device 202, and can include data that defines one or more actions capable of being performed by the automated assistant 204, as well as parameters necessary to perform the actions. The parameter engine 212 can generate one or more parameters for an intent, action, and/or slot value, and provide the one or more parameters to an output generating engine 214. The output generating engine 214 can use the one or more parameters to communicate with an assistant interface 220 for providing an output to a user, and/or communicate with one or more applications 234 for providing an output to one or more applications 234.

In some implementations, the automated assistant 204 can be an application that can be installed "on-top of" an operating system of the computing device 202 and/or can itself form part of (or the entirety of) the operating system of the computing device 202. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 202. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 202 can include one or more applications 234 which can be provided by a third-party entity that is different from an entity that provided the computing device 202 and/or the automated assistant 204. An application state engine of the automated assistant 204 and/or the computing device 202 can access application data 230 to determine one or more actions capable of being performed by one or more applications 234, as well as a state of each application of the one or more applications 234 and/or a state of a respective device that is associated with the computing device 202. A device state engine of the automated assistant 204 and/or the computing device 202 can access device data 232 to determine one or more actions capable of being performed by the computing device 202 and/or one or more devices that are associated with the computing device 202. Furthermore, the application data 230 and/or any other data (e.g., device data 232) can be accessed by the automated assistant 204 to generate contextual data 236, which can characterize a context in which a particular application 234 and/or device is executing, and/or a context in which a particular user is accessing the computing device 202, accessing an application 234, and/or any other device or module.

While one or more applications 234 are executing at the computing device 202, the device data 232 can characterize a current operating state of each application 234 executing at the computing device 202. Furthermore, the application data 230 can characterize one or more features of an executing application 234, such as content of one or more graphical user interfaces being rendered at the direction of one or more applications 234. Alternatively, or additionally, the application data 230 can characterize an action schema, which can be updated by a respective application and/or by the automated assistant 204, based on a current operating status of the respective application. Alternatively, or additionally, one or more action schemas for one or more applications 234 can remain static, but can be accessed by the application state engine in order to determine a suitable action to initialize via the automated assistant 204.

The computing device 202 can further include an assistant invocation engine 222 that can use one or more trained machine learning models to process application data 230, device data 232, contextual data 236, and/or any other data that is accessible to the computing device 202. The assistant invocation engine 222 can process this data in order to determine whether or not to wait for a user to expressly speak an invocation phrase to invoke the automated assistant 204, or consider the data to be indicative of an intent by the user to invoke the automated assistant—in lieu of requiring the user to explicitly speak the invocation phrase. For example, the one or more trained machine learning models can be trained using instances of training data that are based on scenarios in which the user is in an environment where multiple devices and/or applications are exhibiting various operating states. The instances of training data can be generated in order to capture training data that characterizes contexts in which the user invokes the automated assistant and other contexts in which the user does not invoke the automated assistant. When the one or more trained machine learning models are trained according to these instances of training data, the assistant invocation engine 222 can cause the automated assistant 204 to detect, or limit detecting, spoken invocation phrases from a user based on features of a context and/or an environment. Additionally, or alternatively, the assistant invocation engine 222 can cause the automated assistant 204 to detect, or limit detecting for one or more assistant commands from a user based on features of a context and/or an environment. In some implementations, the assistant invocation engine 222 can be disabled or limited based on the computing device 202 detecting an assistant suppressing output from another computing device. In this way, when the computing device 202 is detecting an assistant suppressing output, the automated assistant 204 will not be invoked based on contextual data 236—which would otherwise cause the automated assistant 204 to be invoked if the assistant suppressing output was not being detected.

In some implementations, the system 200 can include a proximity indication engine 216 that can determine, based on data available to the system 200, whether to initialize a process for estimating a distance between devices. Alternatively, or additionally, the proximity indication engine 216 can determine, based on the data, whether to initialize a process for determining whether a user is wearing their wearable computing device while holding onto an additional computing device. In some implementations, the data can include sensor data from one or more sensors of either, or both, of the devices, and/or any other information that can indicate whether or not the user is wearing their wearable computing device while holding onto an additional computing device. In some implementations, the sensor data can include audio data, light data, motion data, touch data, bio sensor, and/or any other data that can be communicated by a sensor, with prior permission from the user. When the data indicates that a user is wearing their wearable computing device (e.g., based on a heartbeat sensor) while gripping their cellular phone (e.g., based on an accelerometer of the phone), the proximity indication engine 216 can cause a distance estimation engine 218 to initiate a distance estimation process.

In some implementations, the distance estimation engine 218 can cause one or more devices to provide one or more ultrasonic signals in series or concurrently, in furtherance of estimating a distance between the devices. A first computing device can provide a first ultrasonic signal and a second computing device can provide a second ultrasonic signal, and data associated with each respective signal can be utilized by the distance estimation engine 218 to estimate a distance between the devices. For example, a total estimated time from providing the first ultrasonic signal to receiving the second ultrasonic signal can be calculated, minus any processing time and divided by 2, and multiplied by a speed of sound constant to estimate the distance. The distance estimation engine 218 can then compare the estimated distance to a distance threshold for determining whether to make any changes to any application operations available to the devices. For example, when the distance estimation engine 218 determines that the distance threshold is satisfied, a mode selection engine 226 can be tasked with modifying an operating mode of the automated assistant 204.

In some implementations, a decision to change an operating mode of an application, such as the automated assistant 204, can be determined using a neural network processing engine 224. For example, the neural network processing engine 224 can process data associated with the ultrasonic signals communicated between devices. The data can include, but is not limited to time data that characterizes an amount of time that has transpired during the communication of the ultrasonic signals. Alternatively, or additionally, the data can characterize features of a context of the user, such as those features characterized by sensor data of any devices associated with the user, with prior permission from the user. An input to a neural network model can be based on one or more of these sources of data, and an output of the neural network model can indicate whether the user is holding onto their portable computing device while wearing a wearable computing device. In some implementations, the neural network model can be trained using instances of training data that were generated according to a supervised or unsupervised learning process. For example, positive training data instances of the training data can correspond to instances when training participants were holding their portable computing device while wearing their wearable computing device. Additionally, negative training data instances of the training data can correspond to instances when training participants were not holding their portable computing device while wearing their wearable computing device. In some implementations, and prior permission from the user, the neural network model can be further trained and updated, as the user continues to use their wearable computing device and other portable computing device, in furtherance of minimizing occurrences of false positives.

When the user is determined, or estimated, to be holding their computing device while wearing their wearable computing device, the mode selection engine 226 can be invoked to modify an operating mode of the automated assistant 204 and/or any other application. For example, the mode selection engine 226 can cause the automated assistant 204 to operate in a mode for responding to spoken utterances without necessitating any predetermined invocation phrase (e.g., "Assistant . . . ") be initially provided by the user. In other words, the automated assistant 204 can have automatic speech recognition initialized in response to the estimated distance satisfying the distance threshold. In some implementations, the estimated distance can be estimated again, after a duration of time, in furtherance of determining whether to keep the automated assistant 204 operating in this mode. For example, when the estimated distance is determined to no longer satisfy the threshold, the mode selection engine 226 can cause the automated assistant 204 to transition out of the mode, thereby necessitating that the user provide a predetermined invocation phrase, or other predetermined invocation input, to invoke the automated assistant and initialize automatic speech recognition.

Figure 3:
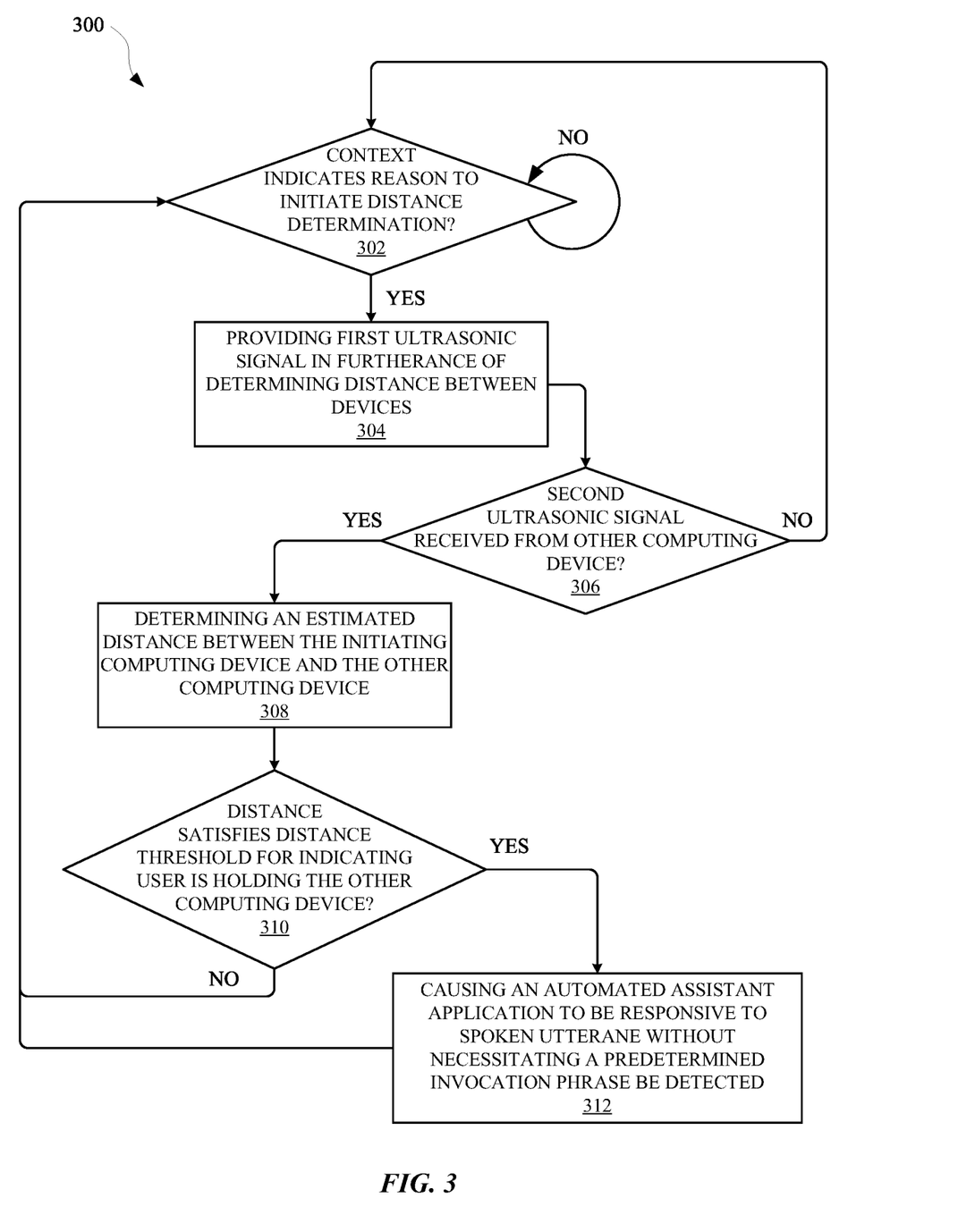
FIG. 3 illustrates a method for using ultrasonic signals to determine whether a user is holding their computing device while wearing a computerized watch, or other wearable computing device, and operating an automated assistant according to whether the user is doing so.

FIG. 3 illustrates a method 300 for using ultrasonic signals to determine whether a user is holding their computing device while wearing a computerized watch, or other wearable computing device, and operating an automated assistant according to whether the user is doing so. The method 300 can be performed by one or more computing devices, applications, and/or any other apparatus or module that can be associated with an automated assistant. The method 300 can include an operation 302 of determining whether a context of the user indicates a reason to initiate a process for determining a distance between a wearable computing device and another portable computing device. For example, a distance between devices can be determined in furtherance of determining whether a user is grasping their portable computing device while wearing another competing device, such as a computerized watch. When the distance is determined to satisfy a distance threshold, one or more settings of one or more applications can be modified accordingly. In some implementations, the operation 302 can be an optional operation that is performed to determine whether certain inputs to a device indicate whether a user may have picked up their portable computer device. For example, an accelerometer, or other sensor that is responsive to a particular type of motion, of a cellular phone and/or a computerized watch can indicate that a user has relocated a device from a stationary position to another position. Alternatively, or additionally, a light sensor, such as a camera or other sensor, can indicate that a user has relocated a device from their pocket, or from another enclosure, to another position. In response, one or both of the devices can initiate the process for determining an estimated distance between the devices.

The method 300 can proceed from the operation 302 to an operation 304, which can include providing a first ultrasonic signal in further determining a distance between the devices. The first ultrasonic signal can embody data, such as a frequency or combination of frequencies, that can be utilized by a receiving device to determine whether to provide a second ultrasonic signal back to the device that provided the first ultrasonic signal. For example, a computerized watch can provide the first ultrasonic signal to a cellular phone, which may be estimated to be nearby a user who is wearing the computerized watch. In some implementations, data can be embodied in the first ultrasonic signal and/or communicated through another modality, such as Wi-Fi, Bluetooth, and/or cellular, to indicate that any receiving device should provide a responsive signal for furthering the distance estimation process. Alternatively, or additionally, the first ultrasonic signal can embody time data that indicates a time at which the computing device rendered the first ultrasonic signal, and this time data can thereafter be used to estimate the distance between the devices.

The method 300 can proceed from the operation 304 to an operation 306, which can include determining whether a second ultrasonic signal has been received, at an audio input interface, from an additional computing device. In some implementations, a frequency of the first ultrasonic signal can be the same or different from another frequency of the second ultrasonic signal. Alternatively, or additionally, data embodied in the first ultrasonic signal can be different from data embodied in the second ultrasonic signal. For example, the second ultrasonic signal can be provided with time data that indicates a time that the additional computing device received a first ultrasonic signal, an amount of time that transpired as the other computer device processed the first ultrasonic signal, and/or a time at which the additional computing device provided the second ultrasonic signal.

When the second ultrasonic signal is determined to have been received from the additional computing device, the method 300 can proceed from the operation 306 to an operation 308. Otherwise, when a second ultrasonic signal has not been received for a threshold duration of time, the method 300 can optionally return to the operation 302. The operation 308 can include determining an estimated distance between the initiating computing device and the other computer device. For example, the initiating computing device can be a computerized watch being worn by the user, and the additional computing device can be a cellular phone that has been picked up by the user with their hand. The estimated distance can then be determined by the time data available to the computerized watch and/or the cellular phone. For example, an amount of time that transpired between providing the first ultrasonic signal from the computerized and the first ultrasonic signal being received by the cellular phone can be utilized, along with an estimation for the speed of sound or the speed of the ultrasonic signal, to estimate the distance between the devices. Alternatively, or additionally, a first time stamp representing the time of rendering the first ultrasonic signal minus a second timestamp representing the time of receiving the second ultrasonic signal can represent a round trip time. An amount of time that the cellular phone processed or otherwise delayed between receiving the first ultrasonic signal and providing the second ultrasonic signal can be subtracted from the round trip time, and the resulting difference can be divided by 2, and then multiplied by the estimated speed of sound, to estimate the distance between the devices.

The method 300 can proceed from the operation 308 to an operation 310 of determining whether the estimated distance satisfies a distance threshold for indicating that the user is holding the additional computing device while also wearing a computing device. In some implementations, the distance threshold can be a static value and/or a dynamic value according to a context in which the distance determination is being performed. For example, the distance threshold that is utilized can be based on a type of device that provides the first ultrasonic signal and/or the second ultrasonic signal, information about the user (accessed with prior permission from the user) such as height and/or other measurements, a location of the user, and/or any other information that can influence a distance between devices that can be carried by a user. When the distance threshold is determined to be satisfied by the estimated distance, the method 300 can proceed from the operation 310 to an operation 312. Otherwise, the method 300 can return to the operation 302 or another operation when the user is estimated to not be holding their portable computing device.

The operation 312 can include causing an automated assistant application to be responsive to spoken utterances without necessitating a predetermined spoken invocation phrase, or other invocation input, be detected by the automated assistant application. The automated assistant application can operate in this mode for a duration of time and/or until the estimated distance no longer satisfies the distance threshold. For example, the estimated distance can be calculated at another time for determining whether the user is still holding onto their portable computing device. Therefore, as the user is, for example, holding onto their cellular phone while also wearing a computerized watch, the user can provide automated assistant inputs without necessitating that the user provide an invocation phrase (e.g., "Assistant . . . ") before each automated assistant input. As a result, computational resources such as battery power and processing bandwidth can be preserved because one or both of the devices may temporarily bypass invocation phrase detection processes and simultaneously activate automatic speech recognition (e.g., activate automatic speech recognition without requiring an invocation phrase be detected or any other user-initiated explicit invocation be detected). Additionally, this can reduce a time for fulfillment of certain requests to the automated assistant, since delays caused by invocation phase detection would be eliminated when the user is holding onto their device.

Figure 4:
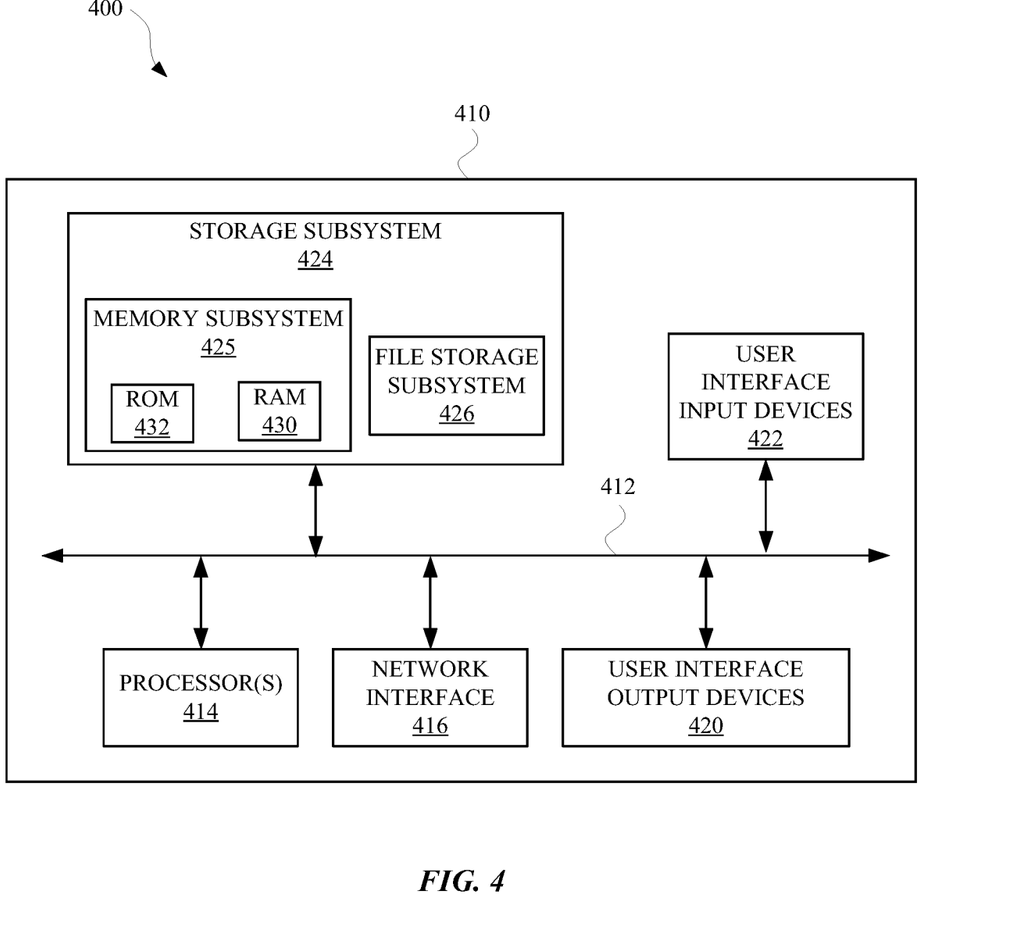
FIG. 4 is a block diagram of an example computer system

FIG. 4 is a block diagram 400 of an example computer system 410. Computer system 410 typically includes at least one processor 414 which communicates with a number of peripheral devices via bus subsystem 412. These peripheral devices may include a storage subsystem 424, including, for example, a memory 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300, and/or to implement one or more of system 200, automated assistant, computerized watch 104, cellular phone 106, and/or any other application, device, apparatus, and/or module discussed herein.

These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as rendering, by a wearable computing device that provides access to an automated assistant application of an additional computing device, a first ultrasonic signal that embodies data for determining whether a user, that is wearing the wearable computing device, is also holding the additional computing device, wherein the additional computing device receives the first ultrasonic signal at an audio input interface of the additional computing device. The method can further include receiving, by the wearable computing device, a second ultrasonic signal that embodies other data for determining whether the user is holding the additional computing device while wearing the wearable computing device. The method can further include determining, based on the data and the other data, that an estimated distance between the wearable computing device and the additional computing device satisfies a threshold distance for indicating that the user is holding the additional computing device while wearing the wearable computing device. The method can further include causing, based on determining that the user is holding the additional computing device, the automated assistant application to operate according to a mode in which invocation phrase detection is at least temporarily bypassed and automatic speech recognition is activated, wherein operating according to the mode causes the automated assistant application to be responsive to spoken utterances from the user without the automated assistant application being already invoked using a predetermined spoken invocation phrase.

In some implementations, causing the automated assistant application to operate according to the mode includes providing, by the wearable computing device, application data to the additional computing device to cause the automated assistant application to operate according to the mode. In some implementations, the other data includes a time of receipt, by the additional computing device, of the data from the wearable computing device. In some implementations, the estimated distance is determined based on a total estimated time from when the wearable computing device provided the first ultrasonic signal to when the wearable computing device received the second ultrasonic signal. In some implementations the additional computing device generates a response time in response to receiving the first ultrasonic signal, the other data includes the response time, and the estimated distance is based on a total estimated from when the wearable computing device provided the first ultrasonic signal to when the wearable computing device received the second ultrasonic signal; and the total estimated time does not include the response time.

In some implementations, the method can further include determining, based on sensor data available to the wearable computing device, that the wearable computing device is experiencing a particular type of motion and/or environment, wherein rendering the first ultrasonic signal is performed by the wearable computing device in response to determining that the wearable computing device is experiencing the particular type of motion and/or environment. In some implementations, the method can further include, subsequent to causing the automated assistant application to operate according to the mode: rendering, by the wearable computing device, the first ultrasonic signal in furtherance of determining whether the user is still wearing the wearable computing device while also holding the additional computing device, wherein the automated assistant application no longer operates according to the mode when the user is determined to no longer be holding the additional computing device.

In other implementations, a method implemented by one or more processors is set forth as including operations such as receiving, from a wearable computing device that provides access to an automated assistant application of an additional computing device, a first ultrasonic signal that embodies data for determining whether a user that is wearing the wearable computing device is also holding the additional computing device, wherein the additional computing device receives the first ultrasonic signal at an audio input interface of the additional computing device. The method can further include rendering, by the additional computing device to the wearable computing device, a second ultrasonic signal that embodies other data for determining whether the user is holding the additional computing device while wearing the wearable computing device. The method can further include receiving, by the additional computing device, time data that is based on the first ultrasonic signal and the second ultrasonic signal, wherein the time data indicates an estimated trip time for communicating one or more signals between the wearable computing device and the additional computing device. The method can further include determining, based on the time data, that an estimated distance between the wearable computing device and the additional computing device satisfies a threshold distance for indicating whether the user is holding the additional computing device while wearing the wearable computing device. The method can further include causing, based on determining that the user is holding the additional computing device while wearing the wearable computing device, the automated assistant application to operate according to a mode in which invocation phrase detection is at least temporarily suppressed and automatic speech recognition is activated, wherein operating according to the mode causes the automated assistant application to be responsive to spoken utterances from the user without the automated assistant application being already invoked using a predetermined spoken invocation phrase.

In some implementations, the time data indicates a time that the wearable computing device provided the first ultrasonic signal, and the estimated trip time is determined using the time indicated by the wearable computing device. In some implementations, the data embodied in the first ultrasonic signal is a frequency that is different from a separate frequency embodied in the second ultrasonic signal as the other data. In some implementations, the method can further include determining, based on sensor data available to the additional computing device, that the additional computing device is experiencing a particular type of motion and/or environment, wherein the wearable computing device provides the first ultrasonic signal in response to the additional computing device experiencing the particular type of motion and/or environment.

In some implementations, the other data includes a time of receipt, by the additional computing device, of the first ultrasonic signal from the wearable computing device. In some implementations, the other data further includes a response time that indicates an amount of time that transpired between the additional computing device receiving the first ultrasonic signal and providing the second ultrasonic signal. In some implementations, the method can further include subsequent to causing the automated assistant application to operate according to the mode: rendering, by the additional computing device, the second ultrasonic signal in furtherance of determining whether the user that is still wearing the wearable computing device while also holding the additional computing device, wherein the automated assistant application no longer operates according to the mode when the user is determined to no longer be holding the additional computing device.

In yet other implementations, a method implemented by one or more processors is set forth as including operations such as rendering, by a wearable computing device that provides access to an automated assistant application of an additional computing device, a first ultrasonic signal for determining whether a user that is wearing the wearable computing device is also holding an additional computing device. The method can further include receiving, based on rendering the first ultrasonic signal, a second ultrasonic signal for determining whether the user is holding the additional computing device while wearing the wearable computing device. The method can further include processing an input that is based on the first ultrasonic signal and the second ultrasonic signals, wherein processing the input is performed using a neural network in furtherance of determining whether the user is holding the additional computing device while wearing the wearable computing device, and wherein an output of the neural network indicates whether the user is holding the additional computing device while wearing the wearable computing device. The method can further include, in response to the output indicating that the user is holding the additional computing device while wearing the wearable computing device: causing the automated assistant application to operate according to a mode in which invocation phrase detection is at least temporarily bypassed and automatic speech recognition is activated, wherein operating according to the mode causes the automated assistant application to be responsive to spoken utterances from the user without the automated assistant application being already invoked using a predetermined spoken invocation phrase.

In some implementations, processing the input using the neural network includes: applying the input to a neural network model that is trained from supervised training data instances, including positive supervised training data instances in which users are holding devices when ultrasonic signals are rendered from other wearable computing devices and negative supervised training data instances in which the users are not holding the devices when the ultrasonic signals are rendered from the other wearable computing devices. In some implementations, the input indicates an estimated distance between the wearable computing device and the additional computing device, and the estimated distance is determined based on one or more time stamps generated by the wearable computing device and/or the additional computing device. In some implementations, the input is based on one or more time stamps corresponding to the first ultrasonic signal and/or the second ultrasonic signal. In some implementations, the method can further include, determining, based on sensor data available to the wearable computing device, that the wearable computing device is experiencing a particular type of motion and/or environment, wherein the wearable computing device provides the first ultrasonic signal in response to the wearable computing device experiencing the particular type of motion and/or environment. In some implementations, the input data characterizes at least a portion of the sensor data available to the wearable computing device.

I claim:

1. A method implemented by one or more processors, the method comprising:
   rendering, by a wearable computing device that provides access to an automated assistant application of an additional computing device, a first ultrasonic signal that embodies data for determining whether a user, that is wearing the wearable computing device, is also holding the additional computing device,
      wherein the additional computing device receives the first ultrasonic signal at an audio input interface of the additional computing device;
   receiving, by the wearable computing device, a second ultrasonic signal that embodies other data for determining whether the user is holding the additional computing device while wearing the wearable computing device;
   determining, based on the data and the other data, that an estimated distance between the wearable computing device and the additional computing device satisfies a threshold distance for indicating that the user is holding the additional computing device while wearing the wearable computing device; and
   causing, based on determining that the user is holding the additional computing device, the automated assistant application to operate according to a mode in which invocation phrase detection is at least temporarily bypassed and automatic speech recognition is activated,
      wherein operating according to the mode causes the automated assistant application to be responsive to spoken utterances from the user without the automated assistant application being already invoked using a predetermined spoken invocation phrase.

2. The method of claim 1, wherein causing the automated assistant application to operate according to the mode includes:
   providing, by the wearable computing device, application data to the additional computing device to cause the automated assistant application to operate according to the mode.

3. The method of claim 1, wherein the other data includes a time of receipt, by the additional computing device, of the data from the wearable computing device.

4. The method of claim 1, wherein the estimated distance is determined based on a total estimated time from when the wearable computing device provided the first ultrasonic signal to when the wearable computing device received the second ultrasonic signal.

5. The method of claim 1,
   wherein: the additional computing device generates a response time in response to receiving the first ultrasonic signal, the other data includes the response time, and the estimated distance is based on a total estimated time from when the wearable computing device provided the first ultrasonic signal to when the wearable computing device received the second ultrasonic signal; and
   wherein the total estimated time does not include the response time.

6. The method of claim 1, further comprising:
   determining, based on sensor data available to the wearable computing device, that the wearable computing device is experiencing a particular type of motion and/or environment,
      wherein rendering the first ultrasonic signal is performed by the wearable computing device in response to determining that the wearable computing device is experiencing the particular type of motion and/or environment.

7. The method of claim 1, further comprising:
   subsequent to causing the automated assistant application to operate according to the mode:
      rendering, by the wearable computing device, the first ultrasonic signal in furtherance of determining whether the user is still wearing the wearable computing device while also holding the additional computing device,
         wherein the automated assistant application no longer operates according to the mode when the user is determined to no longer be holding the additional computing device.

8. A method implemented by one or more processors, the method comprising:
   receiving, from a wearable computing device that provides access to an automated assistant application of an additional computing device, a first ultrasonic signal that embodies data for determining whether a user that is wearing the wearable computing device is also holding the additional computing device,
      wherein the additional computing device receives the first ultrasonic signal at an audio input interface of the additional computing device;
   rendering, by the additional computing device to the wearable computing device, a second ultrasonic signal that embodies other data for determining whether the user is holding the additional computing device while wearing the wearable computing device;
   receiving, by the additional computing device, time data that is based on the first ultrasonic signal and the second ultrasonic signal,
      wherein the time data indicates an estimated trip time for communicating one or more signals between the wearable computing device and the additional computing device;
   determining, based on the time data, that an estimated distance between the wearable computing device and the additional computing device satisfies a threshold distance for indicating whether the user is holding the additional computing device while wearing the wearable computing device; and
   causing, based on determining that the user is holding the additional computing device while wearing the wearable computing device, the automated assistant application to operate according to a mode in which invocation phrase detection is at least temporarily suppressed and automatic speech recognition is activated,
  wherein operating according to the mode causes the automated assistant application to be responsive to spoken utterances from the user without the automated assistant application being already invoked using a predetermined spoken invocation phrase.

9. The method of claim 8, wherein the time data indicates a time that the wearable computing device provided the first ultrasonic signal, and the estimated trip time is determined using the time indicated by the wearable computing device.

10. The method of claim 8, wherein the data embodied in the first ultrasonic signal is a frequency that is different from a separate frequency embodied in the second ultrasonic signal as the other data.

11. The method of claim 8, further comprising:
determining, based on sensor data available to the additional computing device, that the additional computing device is experiencing a particular type of motion and/or environment,
  wherein the wearable computing device provides the first ultrasonic signal in response to the additional computing device experiencing the particular type of motion and/or environment.

12. The method of claim 8, wherein the other data includes a time of receipt, by the additional computing device, of the first ultrasonic signal from the wearable computing device.

13. The method of claim 12, wherein the other data further includes a response time that indicates an amount of time that transpired between the additional computing device receiving the first ultrasonic signal and providing the second ultrasonic signal.

14. The method of claim 7, further comprising:
subsequent to causing the automated assistant application to operate according to the mode:
  rendering, by the additional computing device, the second ultrasonic signal in furtherance of determining whether the user that is still wearing the wearable computing device while also holding the additional computing device,
    wherein the automated assistant application no longer operates according to the mode when the user is determined to no longer be holding the additional computing device.

15. A method implemented by one or more processors, the method comprising:
rendering, by a wearable computing device that provides access to an automated assistant application of an additional computing device, a first ultrasonic signal for determining whether a user that is wearing the wearable computing device is also holding an additional computing device;
receiving, based on rendering the first ultrasonic signal, a second ultrasonic signal for determining whether the user is holding the additional computing device while wearing the wearable computing device;
processing an input that is based on the first ultrasonic signal and the second ultrasonic signal,
  wherein processing the input is performed using a neural network in furtherance of determining whether the user is holding the additional computing device while wearing the wearable computing device, and
  wherein an output of the neural network indicates whether the user is holding the additional computing device while wearing the wearable computing device; and
in response to the output indicating that the user is holding the additional computing device while wearing the wearable computing device:
  causing the automated assistant application to operate according to a mode in which invocation phrase detection is at least temporarily bypassed and automatic speech recognition is activated,
    wherein operating according to the mode causes the automated assistant application to be responsive to spoken utterances from the user without the automated assistant application being already invoked using a predetermined spoken invocation phrase.

16. The method of claim 15, wherein processing the input using the neural network includes:
applying the input to a neural network model that is trained from supervised training data instances, including positive supervised training data instances in which users are holding devices when ultrasonic signals are rendered from other wearable computing devices and negative supervised training data instances in which the users are not holding the devices when the ultrasonic signals are rendered from the other wearable computing devices.

17. The method of claim 15, wherein the input indicates an estimated distance between the wearable computing device and the additional computing device, and the estimated distance is determined based on one or more time stamps generated by the wearable computing device and/or the additional computing device.

18. The method of claim 15, wherein the input is based on one or more time stamps corresponding to the first ultrasonic signal and/or the second ultrasonic signal.

19. The method of claim 15, further comprising:
determining, based on sensor data available to the wearable computing device, that the wearable computing device is experiencing a particular type of motion and/or environment,
  wherein the wearable computing device provides the first ultrasonic signal in response to the wearable computing device experiencing the particular type of motion and/or environment.

20. The method of claim 19, wherein the input characterizes at least a portion of the sensor data available to the wearable computing device.

* * * * *